US010106424B2

(12) United States Patent
Cho et al.

(10) Patent No.: US 10,106,424 B2
(45) Date of Patent: Oct. 23, 2018

(54) METHOD FOR MANUFACTURING SILICON USING SILICA AND SILICON MANUFACTURED USING THE SAME

(71) Applicant: KOREA INSTITUTE OF ENERGY RESEARCH, Daejeon (KR)

(72) Inventors: Won Chul Cho, Daejeon (KR); Myung Won Seo, Daejeon (KR); Hai In Lee, Busan (KR); Jae Goo Lee, Daejeon (KR); Ho Won Ra, Daejeon (KR); Sang Jun Yoon, Sejong (KR); Tae Young Mun, Gimpo-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 93 days.

(21) Appl. No.: 15/200,282

(22) Filed: Jul. 1, 2016

(65) Prior Publication Data
US 2017/0137295 A1    May 18, 2017

(30) Foreign Application Priority Data

Nov. 13, 2015    (KR) .................. 10-2015-0159466

(51) Int. Cl.
C01B 33/023    (2006.01)
(52) U.S. Cl.
CPC .................. *C01B 33/023* (2013.01)
(58) Field of Classification Search
CPC .................................................. C01B 33/023
See application file for complete search history.

(56) References Cited

U.S. PATENT DOCUMENTS 6,152,982 A * 11/2000 Froes .................. B22F 9/023
753/343

FOREIGN PATENT DOCUMENTS

| JP | 2001064733 | 3/2001 |
| KR | 102020033434 | 4/2012 |
| KR | 101157373 | 6/2012 |
| KR | 101405886 | 6/2014 |
| KR | 101527644 | 6/2015 |

OTHER PUBLICATIONS

Hwa, Yoon, et al. "Mesoporous Nano-Si Anode for Li-ion Batteries Produced by Magnesio-Mechanochemical Reduction of Amorphous SiO2." Energy Technology 1.5-6 (2013): 327-331 (Year: 2013).*
Liu, Nian, et al. "Rice husks as a sustainable source of nanostructured silicon for high performance Li-ion battery anodes." Scientific reports 3 (2013). (Year: 2013).*
Takacs, Laszlo. "Self-sustaining reactions induced by ball milling." Progress in Materials Science 47.4 (2002): 355-414. (Year: 2002).*

* cited by examiner

*Primary Examiner* — Melvin C. Mayes
*Assistant Examiner* — Michael Forrest
(74) *Attorney, Agent, or Firm* — Cantor Colburn LLP

(57) ABSTRACT

A method of preparing silicon using silica includes placing silica in a reaction chamber; adding a reducing agent into the reaction chamber; feeding a material for impact into the reaction chamber and sealing the reaction chamber; and reducing the silica to silicon by allowing the material for impact to generate a physical impact inside the reaction chamber. The preparation method of silicon using silica does not employ a high-temperature high-pressure process and provides a preparation method of silicon by which the porous structure of the silica before a reduction reaction is maintained within the silicon even after the reaction.

10 Claims, 10 Drawing Sheets

METHOD FOR MANUFACTURING SILICON USING SILICA AND SILICON MANUFACTURED USING THE SAME

CROSS-REFERENCE TO RELATED APPLICATION

This application claims priority to and the benefit of Korean Patent Application No. 10-2015-0159466 filed on Nov. 13, 2015, the disclosure of which is incorporated herein by reference in its entirety.

BACKGROUND

1. Technical Field

The present invention relates to a technique of producing silicon from silica.

2. Description of the Related Art

Silicon is used in various fields such as those of semiconductors, solar cells, displays, and anode materials for secondary batteries. As the usability of silicon as an advanced material has increased recently, much of domestic and international research and development is focused on silicon production and related technologies. Silicon can be obtained from silica, i.e. silicon dioxide ($SiO_2$). $SiO_2$ is one of the most common compounds found on the earth, and research is being steadily made to convert and purify low value silica into high value silicon for use.

Silica as a raw material for silicon is mostly collected from minerals or sand, and, recently, research has also been actively made to use silica which constitutes the skeleton of plants. The plant-derived silica contains silica at relatively high purity due to a process of "selective absorption and fixation (natural selectivity) of a biological silica" in roots. In particular, compared to mineral silica extracted from sand, the plant-derived silica has the advantage of containing less impurities (e.g. boron and phosphorus) that affect the efficiency of solar cells. Since the impurities such as boron and phosphorus are conventionally difficult to be removed by an acid treatment process or the like, the impurities have hindered the preparation of high-purity silicon by direct reduction. However, the plant-derived silica is advantageous in that its purity can be improved by the acid treatment or the like, because in the plant-derived silica, boron, phosphorus, and the like are almost non-existent, and the content of impurities such as aluminum and iron are lower compared to other silica sources (e.g. sand).

The plant-derived silica has evolved to attain a structure capable of buffering an external impact so as to serve as an exoskeleton of plants. In addition, a silica layer of plants takes a nanoporous structure which enables water and air to pass through while protecting an internal structure of plants from bacteria, viruses, and the like trespassing from the outside. Although silica was used as absorbent, filler because of its original structure, the up-to-date research is focused on utilization of nanoporous nature of silicon for solar cell, secondary battery anode material when silica is reduced into silicon.

In reducing silica to silicon, the most frequently used method is thermal reduction (metallothermic reduction or carbothermal reduction) that uses, as a reducing agent, a metal with a large reactivity (e.g. an alkali metal) or carbon. Generally, in the thermal reduction, a reduction reaction is caused by heating to a temperature equal to or greater than the melting point ($T_m$) of the reducing agent. As Korean Patent No. 1405886 and Korean Laid-open Patent Application No. 2012-0033434 disclose a reduction reaction by heating to a temperature ranging from 1000 to 1200° C. in a high temperature electric furnace, an electric arc furnace, a plasma reactor, or the like, and Korean Patent No. 1527644 discloses a reduction reaction by heating to a temperature ranging from 600 to 1100° C. for 3 hours in a heating reactor, the thermal reduction always involves a high-temperature process of around 1000° C.

Even though most of the known techniques are performed at a high temperature, it is not sufficient to improve conversion, because the melting point of silica is 3000° C. or greater and the reduction reaction of silica requires very high activation energy. In addition, there are problems of the waste of resources, disposal expenses, or the like resulting from the combustion of plant fiber, volatilization by heat treatment, or decomposition by an acid treatment in acquiring the plant-derived silica. In reducing silica to silicon, there is also a problem of using a process (e.g. a high-temperature high-pressure process) that is costly relative to the supply and demand of raw materials.

CONVENTIONAL ART DOCUMENTS

Patent Documents (Patent Document 1) Korean Patent No. 1405886
(Patent Document 2) Korean Laid-open Patent Application No. 2012-0033434
(Patent Document 3) Korean Patent No. 1527644

SUMMARY

The present invention is designed to solve the aforementioned problems of conventional art and is directed to providing a method of preparing silicon using silica, wherein the method enables the acquisition of porous silicon in a simple way by performing a reduction reaction by maintaining, while avoiding disrupting, a microstructure of porous silica.

In addition, the present invention is directed to providing silicon with a porous microstructure that is prepared by the preparation method.

To achieve the above objectives, the method of preparing silicon using silica according to the present invention includes placing silica in a reaction chamber; adding a reducing agent into the reaction chamber; feeding a material for impact into the reaction chamber and sealing the reaction chamber; and reducing the silica to silicon by allowing the material for impact to generate a physical impact inside the reaction chamber.

The silica may be plant-derived silica or rice husk-derived silica.

The rice husk-derived silica may be acquired by heat treatment at a temperature ranging from 500° C. to 700° C. for a period ranging from 30 minutes to 300 minutes under an oxygen atmosphere or an air atmosphere.

The reducing agent may be any one of sodium (Na), magnesium (Mg), calcium (Ca), potassium (K), manganese (Mn), iron (Fe), boron (B), aluminum (Al), titanium (Ti), or a mixture thereof.

The reducing agent may be added at 0.7 to 1.5 equivalent weights with respect to 1 equivalent weight of the silica.

The reaction chamber may be further pressurized after the sealing operation so that the internal pressure falls in a range of 1 bar to 100 bar.

The physical impact may be generated by a linear motion or rotary motion of the material for impact inside the reaction chamber caused by a rotation of the reaction chamber.

The reduction reaction may be terminated after an observation of a dramatic temperature change or pressure change in the reaction chamber.

The reduction reaction may be terminated after a 1.5-fold to 20-fold increase followed by a decrease of the pressure inside the reaction chamber is observed.

Acquisition of reaction products from the reaction chamber and a subsequent acid treatment after the reduction reaction may be further included, and the acid treatment may be carried out by adding an acid whose pH ranges from 0.01 to less than 7.0 at a temperature ranging from 60° C. to 80° C. for a period ranging from 30 minutes to 200 minutes.

The silica-derived porous silicon according to the present invention is prepared by a method of preparing silicon using silica, wherein the method includes placing silica in a reaction chamber; adding a reducing agent into the reaction chamber; feeding a material for impact into the reaction chamber and sealing the reaction chamber; and reducing the silica to silicon by allowing the material for impact to generate a physical impact inside the reaction chamber.

The porosity of the silicon may differ by 100% to 70% with respect to the porosity of the silica, which is a reactant.

The above-described preparation method of silicon using silica according to the present invention provides a method by which the porous structure of the silica before a reduction reaction is maintained uniformly within the silicon obtained after the reaction, while a simple method does not require an additional heating device. The silicon obtained as thus can be used in a variety of fields such those of semiconductors, solar cells, displays, and anode materials for secondary batteries, and more particularly, the silicon can be usefully employed as anode materials for secondary batteries.

DETAILED DESCRIPTION OF EMBODIMENTS

Figure 1:
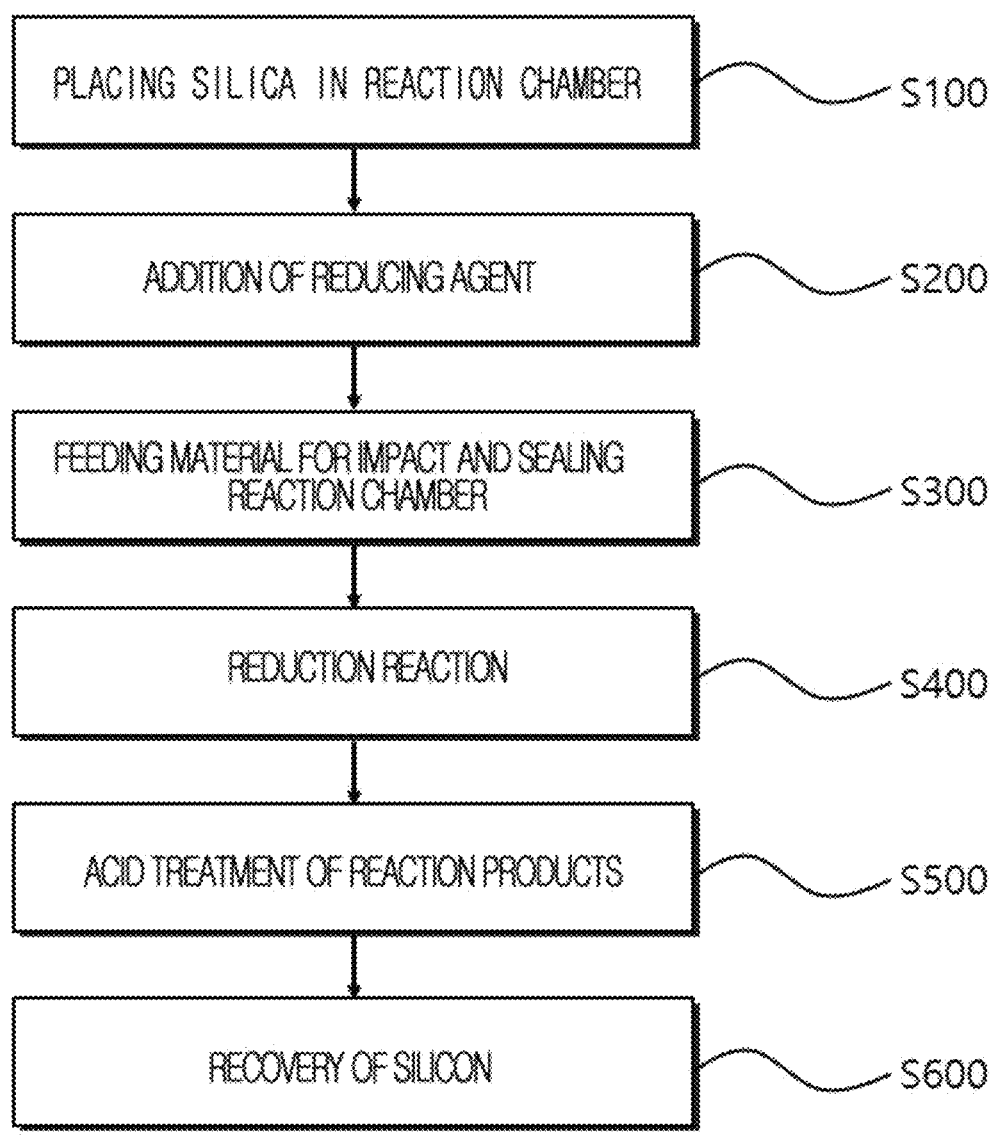
FIG. 1 is a process flowchart of a silicon preparation method using silica according to one exemplary embodiment of the present invention.

Hereinafter, preferred exemplary embodiments will be described in detail with reference to accompanying drawings so that those skilled in the field of the present invention can easily implement the present invention. However, it should be understood that exemplary embodiments disclosed herein and configurations shown in the drawings are merely preferred exemplary embodiments of the present invention and that there may be other equivalents and modifications to serve as substitutes at the time of filing of the present application. Also, when it is deemed that detailed descriptions of known functions or configurations with respect to the preferred exemplary embodiments of the present invention might obscure the subject matter of the present invention, those detailed descriptions will be omitted. Terms described below are defined by considering their functions in the present invention, and the meanings of the terms should be interpreted based on the content throughout this specification. Parts performing similar functions and operations throughout the drawings are denoted by the same reference numerals.

FIG. 1 is a process flowchart of a silicon preparation method using silica according to one exemplary embodiment of the present invention.

Referring to FIG. 1, the method of preparing silicon using silica according to one exemplary embodiment of the present invention includes placing silica in a reaction chamber (S100), adding a reducing agent into the reaction chamber (S200), feeding a material for impact into the reaction chamber and sealing the reaction chamber (S300), reducing the silica to silicon by allowing the material for impact to generate a physical impact inside the reaction chamber (S400), acid-treating the reaction products (S500), and recovering silicon (S600).

During the step S100 of placing silica in the reaction chamber, first, silica which is a raw material is prepared. The silica which is a representative oxide form of silicon is a substance represented by the chemical formula $SiO_2$. The silica as the raw material is one of the most common raw materials found on earth and can be collected typically from sand, etc. Also, as mentioned above, a plant-derived silica may be used. The plant may be rice, wheat, bamboo, barley, corn, soybean, or the like. In the present invention, preferably rice, more preferably a rice husk (RH) (i.e. a chaff or a rice bran portion) is used as the raw material silica. Since each plant-derived material has relatively rigid silica formed inside the plant as a structure to protect itself and adopts a unique structure having porosity, such materials can be applied to various fields.

The mineral-derived silica collected from sand, etc. can be used as a raw material after cleaning and separation. On the other hand, since the plant-derived silica is very likely to include organic substances as impurities, it is preferable to remove the organic substances by a heat treatment (i.e. combustion by heating) or an acid treatment before use, from ash materials that were obtained from a primary heat treatment of the silica. In particular, a by-product resulting from employing the above plant material as biomass or the like may be used as the ashes obtained from the primary heat treatment. The ash is heat-treated at a temperature ranging from 500° C. to 700° C. for a period ranging from 30 minutes to 300 minutes under an atmosphere to which sufficient oxygen or air is supplied. When the heat treatment is conducted at a temperature below 500° C., there is a possibility that the organic substances are not sufficiently combusted such that they are mixed with or attached to the surface of the material as impurities. On the other hand, conducting the heat treatment at a temperature greater than 700° C. is not preferred, for the porous structure of the plant-derived material may be at risk of being deformed by melting at a high temperature. As the method of the heat treatment, any method used conventionally for a similar purpose may be employed.

It is preferable that the reaction chamber has a structure in which the raw material and the reducing agent are mixed homogeneously in the chamber to cause a reaction at a sufficient level. Therefore, the reaction chamber is a tightly sealed horizontal or vertical cylinder type container where the raw material and reducing agent are mixed by rotary motion. The material of the reaction chamber may be the same material as the material for impact or a material that absorbs an internal impact and does not cause a reaction when engaged in collision with the material for impact. The material may be alloy steel, hardened steel, heat-treated steel, zirconia, tungsten carbide, alumina, or agate.

As a preferred exemplary device of the reaction chamber, a high-energy ball milling device may be employed. The interior of the high-energy ball milling device is equipped with a ball that exerts an impact (force) as great as several fold to several tenfold of the acceleration of gravity on a sample in the reaction chamber.

Figure 2:
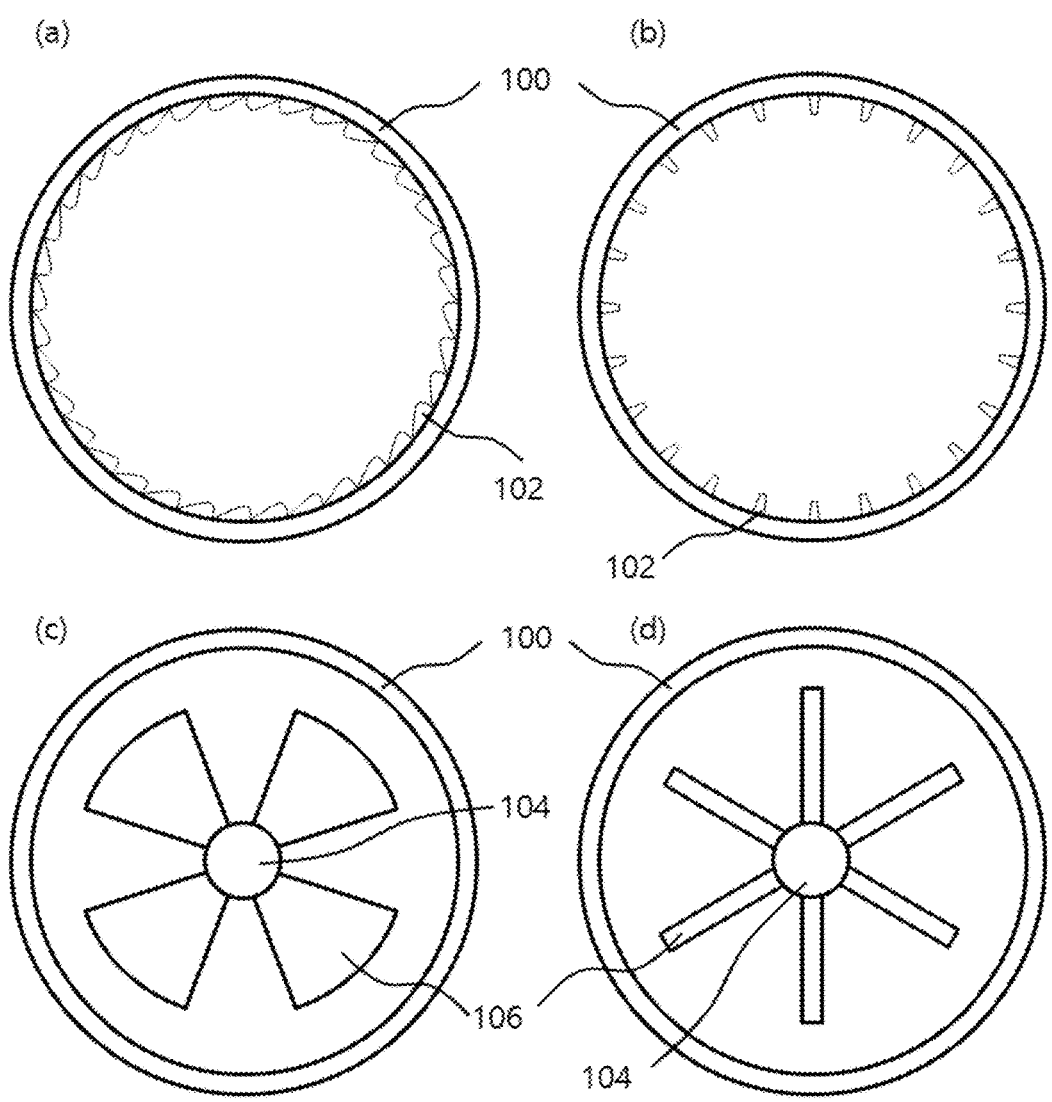
FIG. 2 is a cross-sectional view showing a schematic structure of a reaction chamber according to one exemplary embodiment of the present invention.

To promote the reaction of the raw material and the reducing agent by increasing the magnitude of the physical impact, the reaction chamber may be provided with spikes (102 in (a) and (b) of FIG. 2) or rotary blades (106 in (c) and (d) of FIG. 2) inside the reaction chamber 100, as shown in FIG. 2. The spikes 102 may be formed parallel or perpendicular to the axis of rotation of the reaction chamber 100. Also, the spikes 102 may be different from one another in terms of size and length. The spikes 102 may adopt forms of hexagonal prisms, cylinders, triangular prisms, or square prisms, but are not limited to the above forms and may adopt other forms.

A blade rotation shaft 104 is provided in the reaction chamber 100, on the same axis as the axis of rotation of the reaction chamber 100, and may be provided such that the rotary blades 106 are directed from the blade rotation shaft 104 toward the inner wall of the reaction chamber 100. Like the projecting members 102, the rotary blades 106 may adopt forms of hexagonal prisms, cylinders, triangular prisms, or square prisms, but are not limited thereto and may adopt different forms. Also, the rotary blades 106 may be plates forming a predetermined angle with the blade rotation shaft 104. The rotary blades 106 and the blade rotation shaft 104 may rotate independently of the reaction chamber 100, and they may rotate in the same direction as, or in an opposite direction of, the reaction chamber 100. The shape and internal structure of the reaction chamber 100 is not limited to what is shown in the figure and may adopt different forms.

During the step S200 of adding the reducing agent, the reducing agent may be added at 0.7 to 1.5 equivalent weights with respect to 1 equivalent weight of the silica contained in the reaction chamber. The reducing agent may be any one of sodium (Na), magnesium (Mg), calcium (Ca), potassium (K), manganese (Mn), iron (Fe), boron (B), aluminum (Al), titanium (Ti), or a mixture thereof.

The reaction between the silica and the reducing agent may be represented by the chemical equation 1 as follows:

$$SiO_2 + Re = ReO_2 + Si \qquad (1)$$

(where Re refers to a reducing agent)

The chemical equation (1) corresponds to an exothermic reaction (i.e. spontaneous reaction) where both ΔH and ΔG have negative values. However, since the silica and the reducing agent have a melting point ($T_m$) of several hundred degrees Celsius, the reaction does not take place by the mixing of the silica and the reducing agent alone, and thus, conventionally, the reaction is facilitated by heating or by the use of (an)other catalyst(s). In other words, the reaction (i.e. metallothermic reduction) using the reducing agent had to be carried out at a process temperature of about 1000° C. However, with the method of preparing silicon using silica according to the present invention, it is possible to acquire high-purity silicon without the use of a high-temperature, high-pressure reactor, which is not easy to handle, or an additional catalyst that causes impurities.

During the step S300 of feeding a material for impact into the reaction chamber and sealing the reaction chamber, the material for impact is fed in addition to the silica and the reducing agent to bring the silica and the reducing agent into a reaction by causing a physical impact. Since the aforementioned reaction chamber has a shape of a cylinder, the inside of the reaction chamber forms a curved surface, and thus, the shape of the material for impact is preferably spherical or disk-shaped. The material for impact may be the same type as that of the reaction chamber and is preferably a material that does not generate an impurity by collision with the reaction chamber or with the raw materials.

The sealing of the reaction chamber after feeding the material for impact is essential, because the pressure inside the reaction chamber dramatically increases at the time of "the termination of the reaction (an ignition time)", which will be discussed below. Any method used in the conventional art may be used to seal the reaction chamber.

A process of applying pressure so that the internal pressure of the reaction chamber is in a range of 1 bar to 100 bar after the sealing step S300 may be further included. The pressure is preferably adjusted to a range of 2 bar to 20 bar. As described above, the reaction of the chemical equation 1 is an exothermic reaction but its activation energy is very large. Since a gas-solid reaction proceeds in the present exemplary embodiment, rather than a method of increasing the driving force by increasing the temperature to overcome the activation energy, the internal pressure of the reaction chamber may be increased to facilitate the diffusion of the gas into the interior of the solid. This reduces the "ignition time" of the reduction reaction. The internal pressure of the chamber may be adjusted by filling the chamber with argon (Ar), helium (He), air, nitrogen ($N_2$), a mixed gas thereof, or the like.

The step S100 of placing silica in the reaction chamber and the step S200 of adding the reducing agent may be performed after the step S300 of feeding the material for impact into the reaction chamber and sealing the reaction chamber. In addition, it may also be possible to mix the silica and the reducing agent in advance, before feeding them into the reaction chamber.

Figure 3:
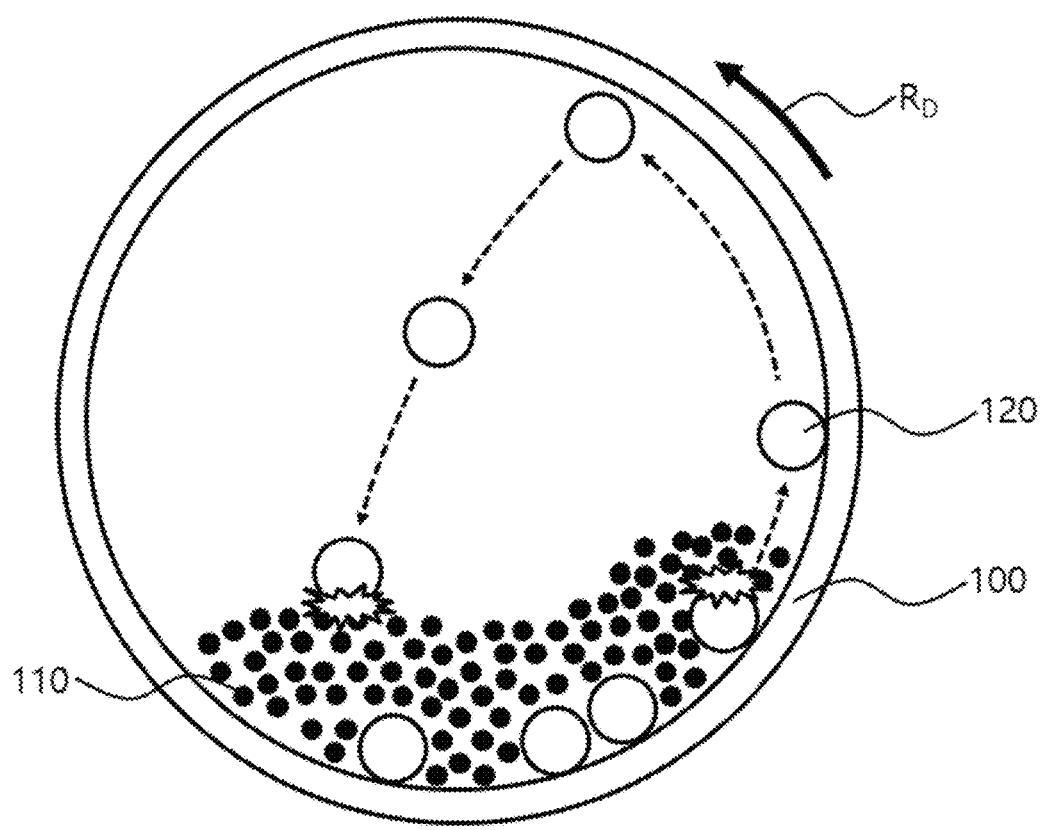
FIG. 3 is a cross-sectional view showing an exemplary reaction process in a reaction chamber according to one exemplary embodiment of the present invention.

The step S400 reducing of the silica to silicon may be achieved when the material for impact 120 exerts a physical impact on a mixture 110 of the silica and the reducing agent, as shown in FIG. 3. In this case, the "physical impact" refers to the phenomenon in which the material for impact 120 collides, through physical motion (i.e. a linear motion or a rotary motion), with the mixture 110 of the silica and the reducing agent. In an example of a horizontal reaction chamber as shown in FIG. 3, when the reaction chamber 100 rotates in the direction marked as $R_D$, the material for impact 120 charged inside rotates along the inner wall of the reaction chamber 100 and, being affected more by the force of gravity than the rotational force of the reaction chamber 100 at a certain point, subsequently falls in the direction of the force of gravity. In this case, the frequency of the impact may be controlled by the size and feeding amount of the material for impact 120, the magnitude of impact on the silica and the reducing agent may depend on the aforementioned form of the internal structure of the reaction chamber 100.

The physical impact crushes the silica and the reducing agent into smaller particle. In addition, the silica is provided with high energy capable of overcoming the activation energy barrier of the reaction with the reducing agent, or the silica is transformed into an ionized state that is capable of reacting with the reducing agent.

Figure 5:
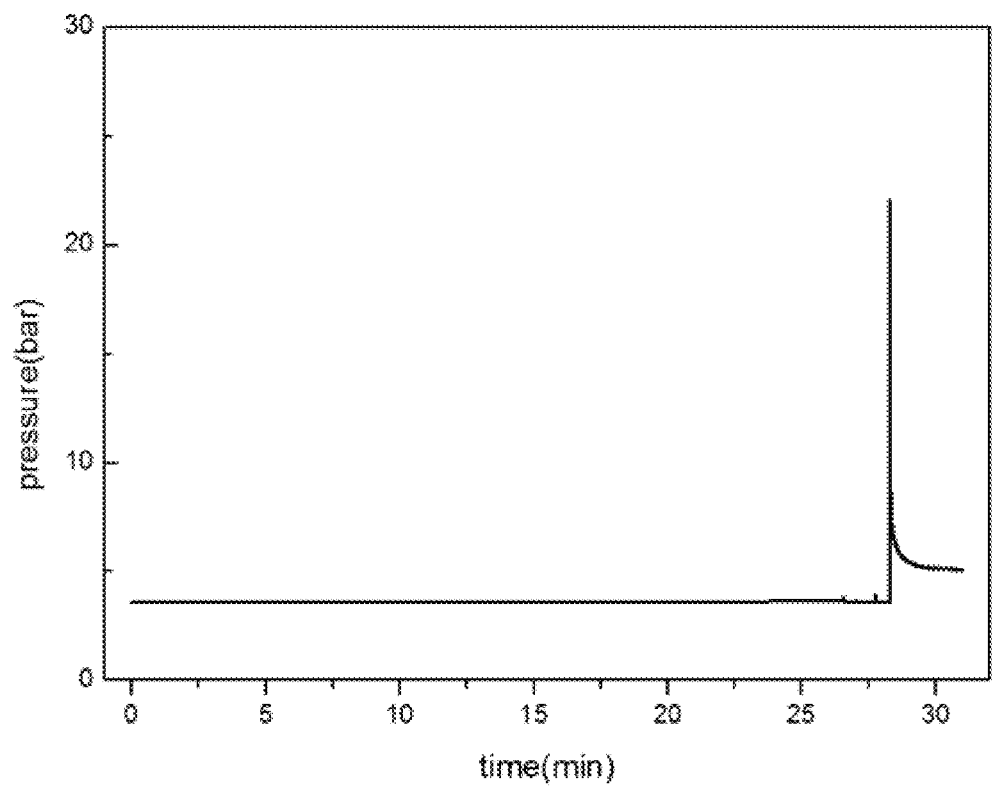
FIG. 5 is a graph for determining an ignition time of a reduction reaction of silica according to another exemplary embodiment of the present invention.

When the energy transferred to the silica and the reducing agent is sufficient to cause a reduction reaction, the reduction reaction occurs and the internal pressure or temperature of the reaction chamber greatly increases. Since the raw materials were initially fed into the reaction chamber at room temperature and normal pressure, after a momentary increase in the pressure to the level in a range of 1.5 times to 20 times the initial internal pressure of the reaction chamber as shown in FIG. 5, the "ignition time" is reached. In this case, the "initial internal pressure" refers to the pressure before the reaction begins. The ignition time depends on the size of the reaction chamber, the feeding amounts of the silica and the reducing agent, and the like, and means that the silica and the reducing agent reacted completely and were converted to an oxide(s) of the reducing agent and silicon.

The physical impact may be continued even after the ignition time, but, in this case, the microstructure of the silica may be collapsed such that the porous microstructure may not be retained. Therefore, it is preferable to stop the reaction chamber within 1 minute to 30 minutes after the ignition time.

During the step S500 of acid-treating the reaction products, the sealing of the reaction chamber is released by opening the reaction chamber after the reaction chamber is sufficiently cooled, since the internal temperature of the reaction chamber is greatly increased at the ignition time. After the reaction products are obtained from the reaction chamber, acid treatment of the $ReO_2$ in the chemical equation 1 or an impurity such as ReSi, which is a substance that can be produced during the reaction, may be further included. The acid treatment may be performed at a temperature in the range of 60° C. to 80° C. for 30 minutes to 200 minutes by adding an acid having a pH of 0.01 to less than 7.0. The type of the acid that can be used during the acid treatment may be hydrochloric acid (HCl), sulfuric acid ($H_2SO_4$), hydrofluoric acid (HF), nitric acid ($HNO_3$), lactic acid, or an acid mixture thereof. The acid type and the duration of the acid treatment may be adjusted by the type and feeding amount of the reducing agent.

During the step S600 of recovering silicon, the acid-treated reaction products are filtered by filtering paper. Subsequently, the filtered reaction products are dried in a drying oven for 5 hours to 24 hours at a temperature in the range of 80° C. to 100° C. to obtain silicon. Any conventional filtration method and drying method may be employed.

It is possible to obtain the silicon of the present invention by the methods described above. To describe more specifically, the silica-derived porous silicon of the present invention is prepared by the method of preparing silicon using silica that includes placing silica in a reaction chamber; adding a reducing agent into the reaction chamber; feeding a material for impact into the reaction chamber and sealing the reaction chamber; and reducing the silica to silicon by allowing the material for impact to generate a physical impact inside the reaction chamber. Since the preparation method is described above in detail, further description will be omitted to avoid repetition.

The silicon prepared according to the present invention retains, without collapse, the structure of porous silica before reduction. In other words, the silica structure is not destroyed even by the aforementioned "physical impact" but recrystallized such that the small pores persist without disappearing. However, since an oxygen atom is lost as silica is reduced, the porosity changes at a certain degree. The porosity of the silicon may differ by 100% to 70% with respect to the porosity of the silica, which is a reactant.

Even after the reduction reaction, the silicon prepared as above retains the uniform porous structure that existed in silica before the reaction, and the obtained silicon can be used in various fields such as those of semiconductors, solar cells, displays, and anode materials for secondary batteries. In particular, having the characteristics of a three-dimensional porous structure, the silicon obtained according to the present invention can be usefully employed as anode materials for secondary batteries, which is required to have high output/high durability characteristics.

Hereinafter, the present invention will be described in detail with reference to examples. However, the following examples are intended merely to exemplify the present invention, and the scope of the present invention is not limited thereto in any sense.

EXAMPLES

Examples 1 to 5

15 g of a rice husk-derived silica (RH-$SiO_2$) was prepared by heat treatment of RH for 3 hours under an air atmosphere at the temperature of 650° C. As the reducing agent, 11.98 g of a magnesium powder (Daejung Chemicals & Metals Co., Ltd.) was added. A 500 ml-tempered steel container was used as the reaction chamber, into which a spherical material for impact made of zirconia and having diameters of 15 mm, 10 mm, and 5 mm was fed to carry out a reaction in a planetary ball mill device (Pulverisette 5, Fritsch, Idar-Oberstein, Germany) in an argon atmosphere. The mass ratio between the material for impact and the silica-magnesium powder mixture was set at 10:1, and the rotational speed of the reaction chamber was set at 250 rpm, and the reaction was conducted for 10 minutes (example 1), 20 minutes (example 2), 30 minutes (example 3), 40 minutes (example 4), and 200 minutes (example 5), respectively.

Figure 4:
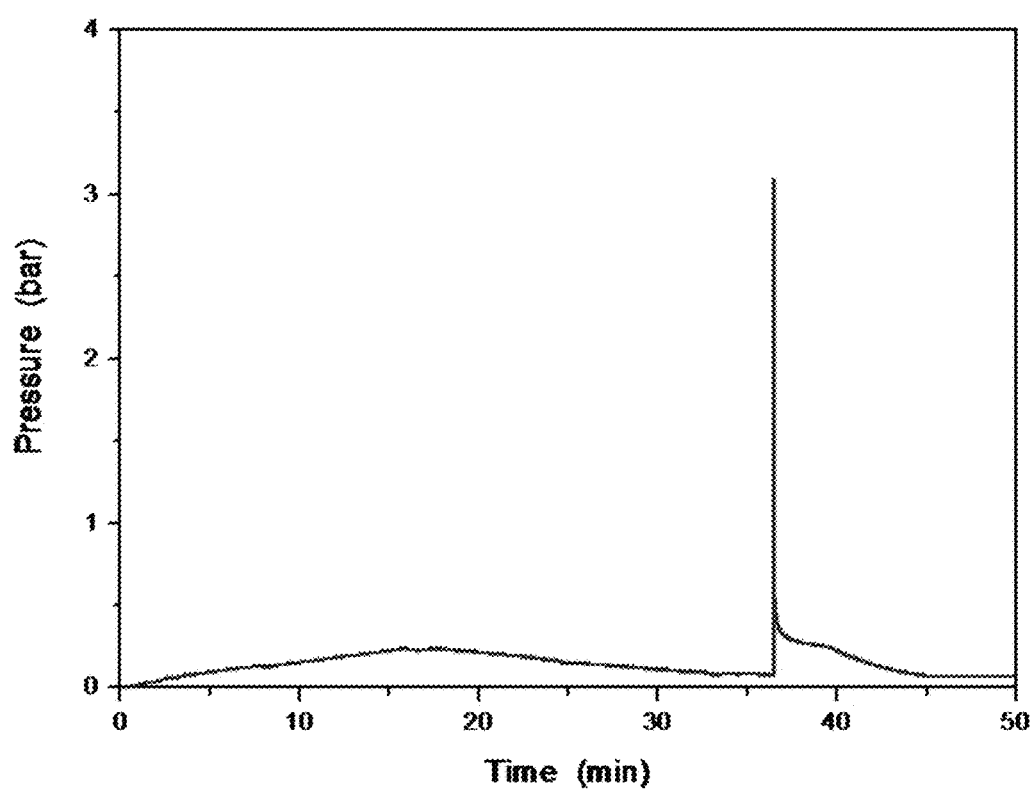
FIG. 4 is a graph for determining an ignition time of a reduction reaction of silica according to one exemplary embodiment of the present invention.

The inner pressure of the reaction chamber was monitored over time using a pressure transmitter (model EVT307-5DO-01F-Q, SMC Co., Tokyo, Japan), and the ignition time at which the pressure decreases after a great increase was determined at around 40 minutes (FIG. 4).

After the reaction was completed, the obtained reaction products in powder forms were acid-treated with 1 M HCl at 80° C. for 1 hour, then filtered and dried to obtain silicon.

Example 6

15 g of a rice husk-derived silica (RH-$SiO_2$) was prepared by heat treatment of RH for 3 hours under an air atmosphere at the temperature of 650° C. As the reducing agent, 13.21 g of a magnesium powder (Daejung Chemicals & Metals Co., Ltd.) was added. A 500 ml-tempered steel container was used as the reaction chamber, into which a spherical material for impact made of zirconia and having diameters of 15 mm, 10 mm, and 5 mm was fed. The reaction was conducted in a planetary ball mill device (Pulverisette 5, Fritsch, Idar- Oberstein, Germany) by injecting air to adjust the pressure inside the container to 3.6 bar. The mass ratio between the material for impact and the silica-magnesium powder mixture was set at 10:1, and the rotational speed of the reaction chamber was set at 250 rpm, and the reaction was conducted for 30 minutes.

The inner pressure of the reaction chamber was monitored over time using a pressure transmitter (model EVT307-5DO-01F-Q, SMC Co., Tokyo, Japan), and the ignition time at which the pressure decreases after a great increase was determined at around 30 minutes (FIG. 5).

After the reaction was completed, the obtained reaction products in powder forms were acid-treated with 1 M HCl at 80° C. for 1 hour, then filtered and dried to obtain silicon.

COMPARATIVE EXAMPLES

Comparative Examples 1 to 4

4 pellets having a diameter of about 16.28 mm were prepared by mixing 2 g of silica prepared in the same conditions as those of the examples with 1.67 g of magnesium. The pellets were then preheated in a furnace at 400° C. and, after increasing the temperature at the rate of 10° C. per minute, were heat-treated for 1 hour in an argon atmosphere at a temperature of 600° C. to 900° C. (comparative examples 1 to 4) to obtain reaction products.

The obtained reaction products were treated with a solution mixture (the actual concentration is 1.0 M) of 1.25 M HCl and 4.38 M acetic acid ($CH_3COOH$), were then treated with a solution mixture of 4.8 wt % HF and 25 wt % $CH_3COOH$ to remove silica residue that did not take part in the reaction, and were subsequently filtered with filtering paper to obtain silicon.

Evaluation

1. X-Ray Diffraction (XRD)

Figure 6:
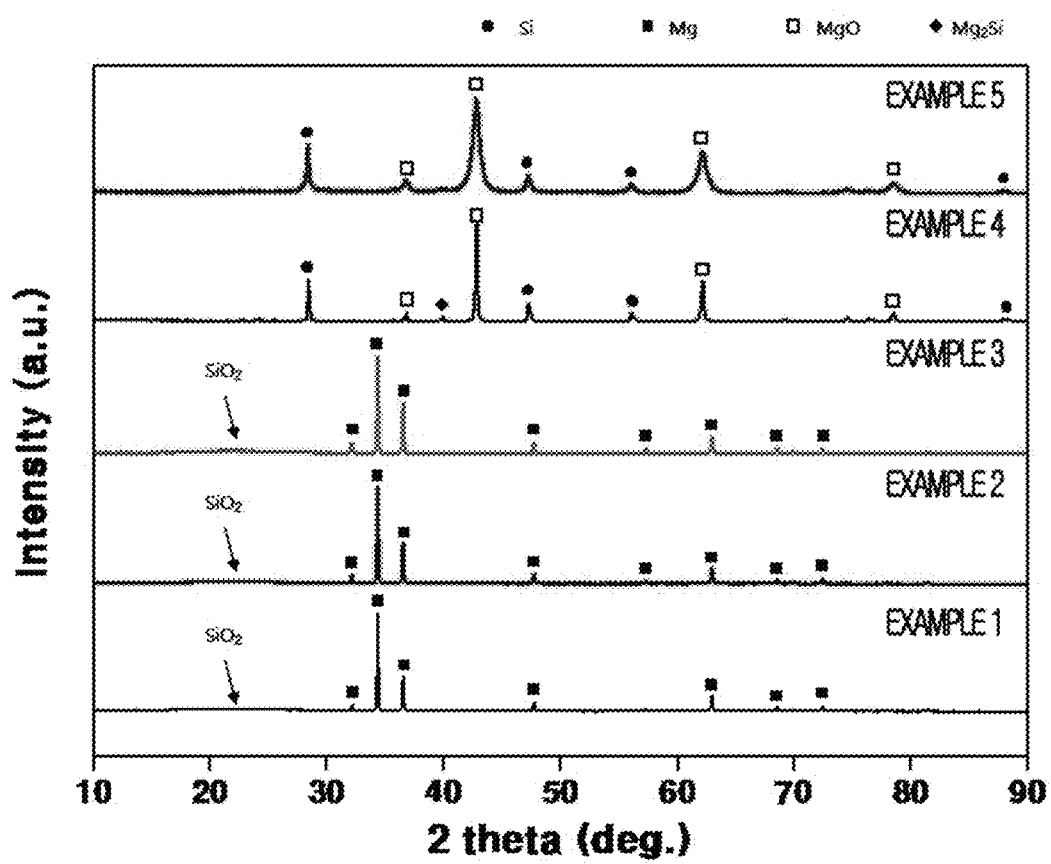
FIG. 6 is a set of graphs showing XRD results for the reaction products (before acid treatment) produced from examples 1 to 5 of the present invention.
Figure 7:
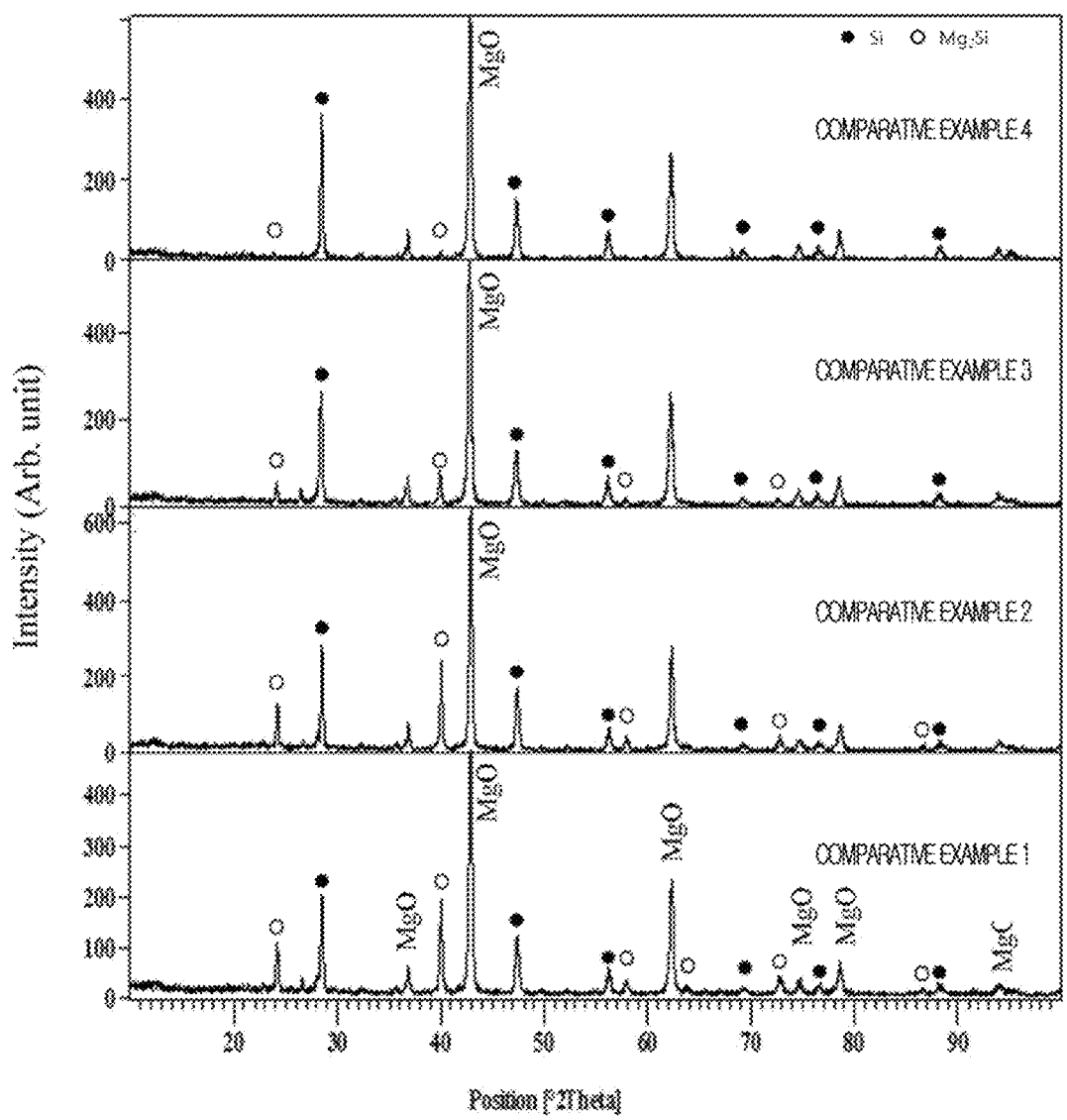
FIG. 7 is a set of graphs showing XRD results for the reaction products (before acid treatment) produced according to comparative examples.

The components of the silicon prepared according to each of the examples 1 to 5 and comparative examples 1 to 4 were measured by XRD prior to the acid treatment (FIGS. 6 and 7). When the XRD peaks of examples 4 and 5, and comparative examples 1 to 4, all of which had undergone the reduction reaction, were mutually compared, it was found that $Mg_2Si$, which is a reaction by-product, was formed in comparative examples 1 to 4 despite the high reaction temperature, whereas in examples 4 and 5, $Mg_2Si$ was almost non-existent or existed in a very small amount. Also, judging from the fact that the samples of examples 1 to 3 (each was treated for 10, 20, and 30 minutes) have a gentle curve corresponding to amorphous silica between 20° and 30° with only magnesium (Mg) peaks appearing, magnesium and silica did not chemically react with each other substantially, which suggests that a self-sustaining reaction began at around 40 minutes.

Figure 8:
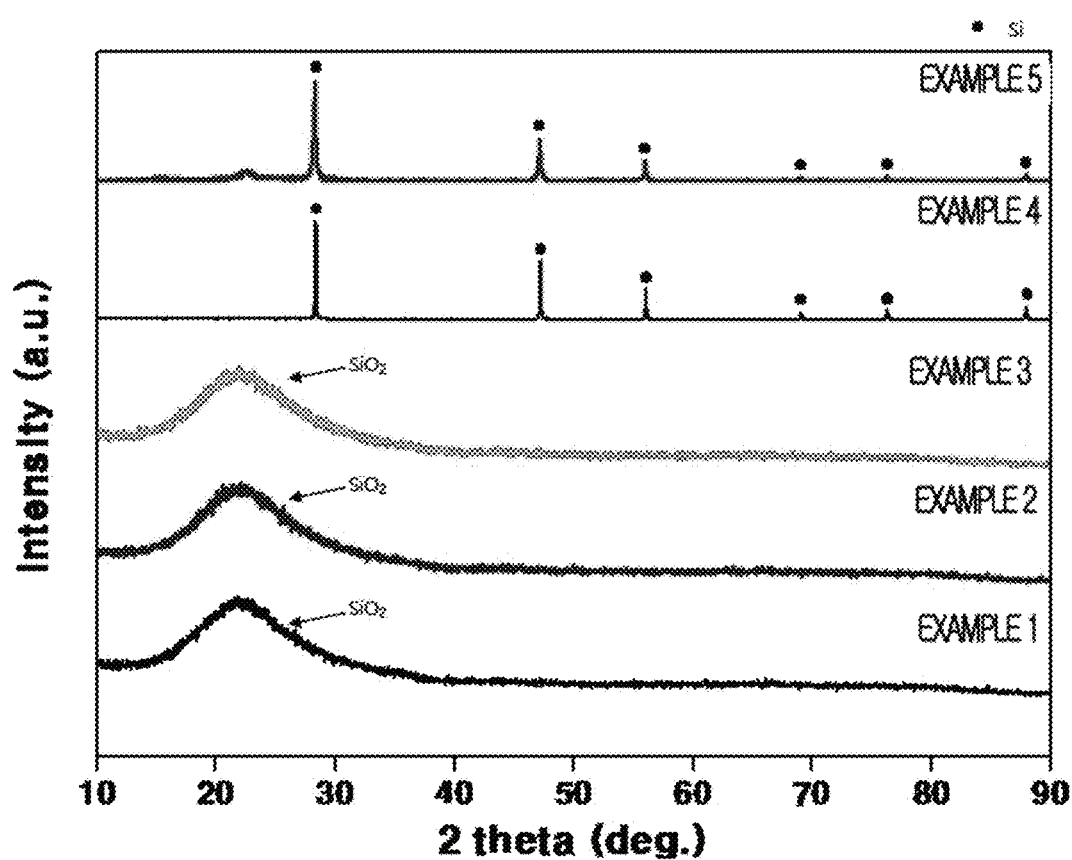
FIG. 8 is a set of graphs showing XRD results for the reaction products produced according to examples 1 to 5 of the present invention and after acid treatment.

The components of the silicon prepared according to each of the examples 1 to 5 were measured by XRD after the acid treatment (FIG. 8), and it was found that unreacted magnesium was removed by the acid in examples 1 to 3 to leave only amorphous silica. It may be suggested based on examples 4 and 5 having only silicon peaks that impurities other than silicon were removed after the acid treatment of silicon. Also, based on the fact that the sample of example 5 had a relatively broad peak compared to that of example 4, it may be determined that the sample of example 5 had reduced crystallinity compared to the sample of example 4. It can be also recognized from the comparison of average crystal size summarized in Table 1 below that the crystallinity of example 5 is lower compared to example 4.

2. Scanning Electron Microscope (SEM)

Figure 9:
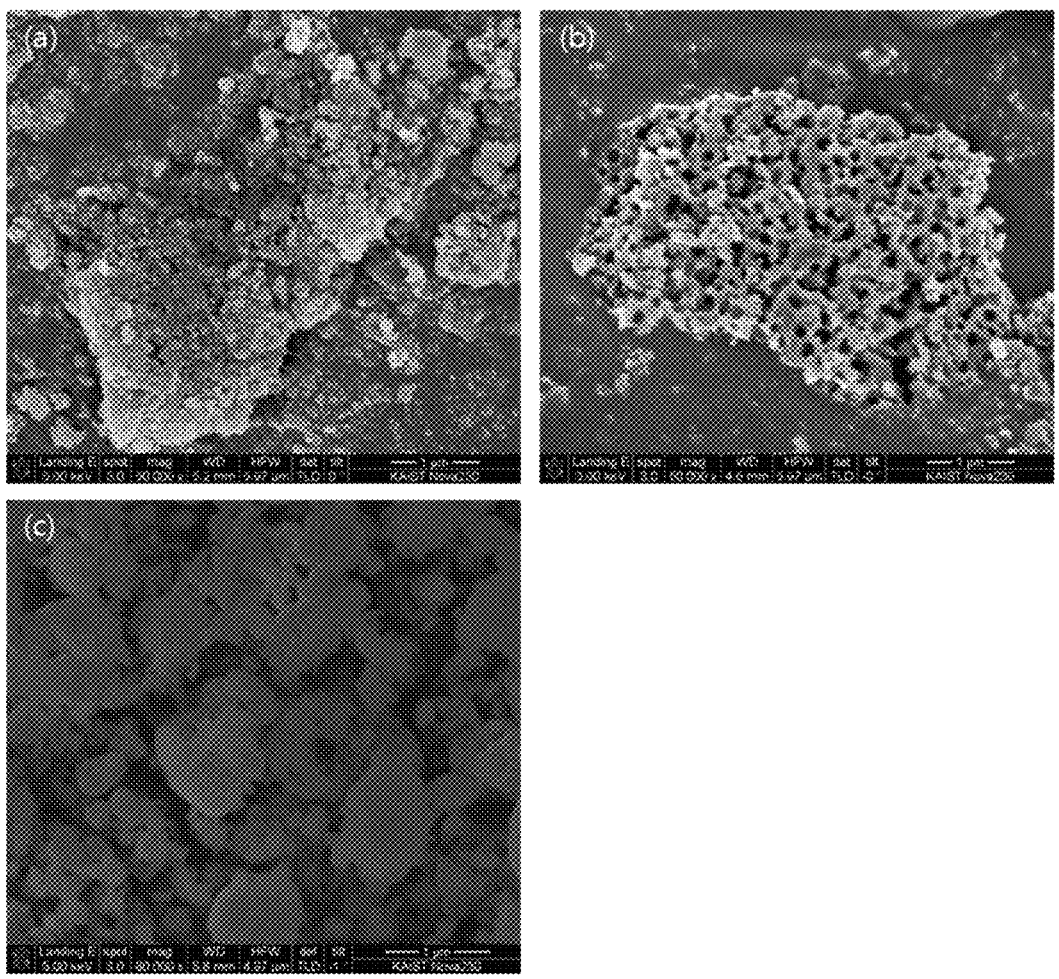
FIG. 9 is a set of SEM images of the reaction products produced according to examples 2, 4, and 5 of the present invention and after acid treatment.
Figure 10:
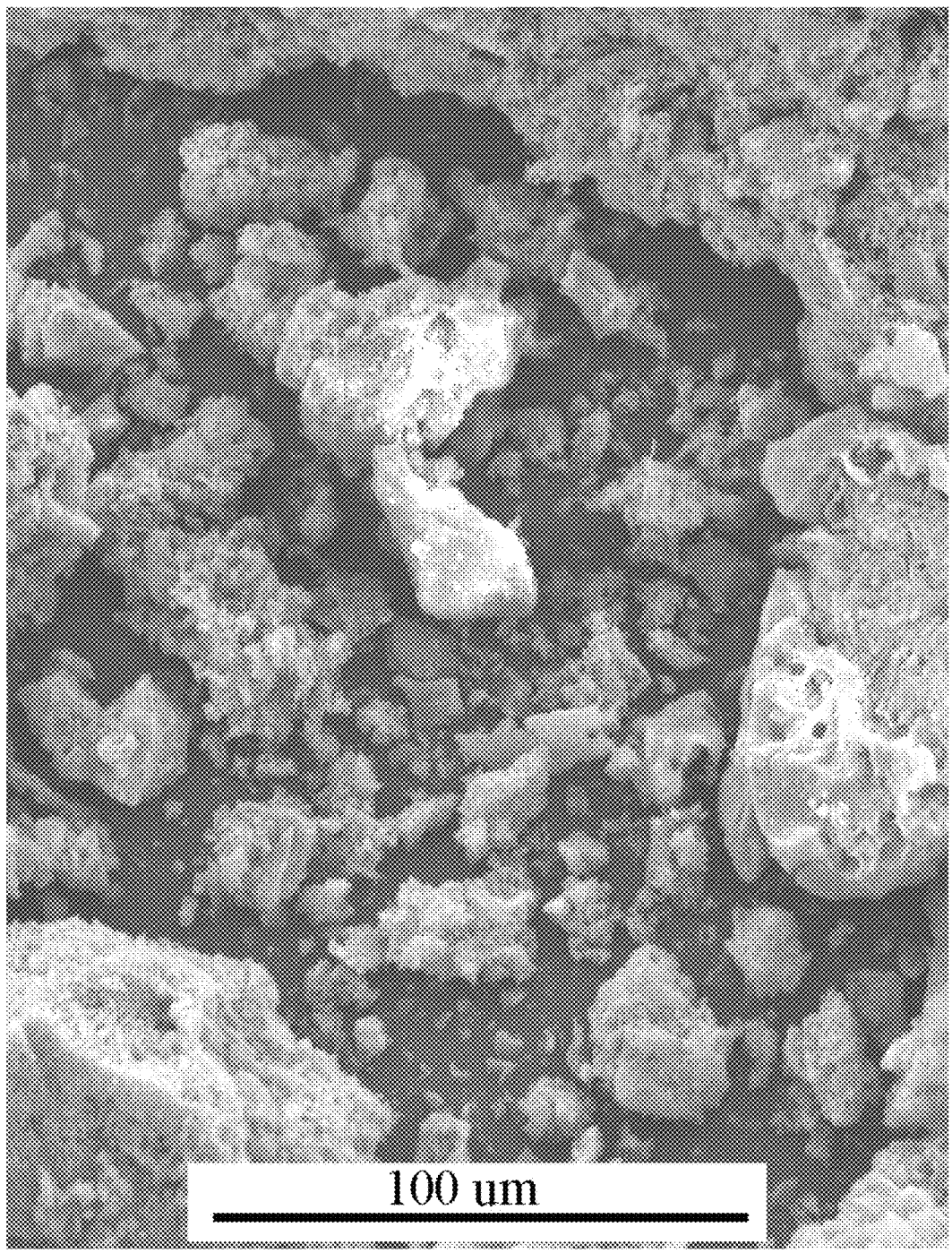
FIG. 10 is an SEM image of silicon after an acid treatment according to a comparative example.

The silicon prepared according to examples 2, 4, 5, and comparative example 4 was observed by SEM after the acid treatment (FIGS. 9 and 10). As seen in (a) and (b) of FIG. 9, the silicon prepared according to examples 2 and 4 retains a porous structure. In contrast, (c) of FIG. 9 shows that the porous structure was destroyed due to particles agglomerating into a mass in example 5, which underwent processing under excessive conditions.

When (b) of FIG. 9 showing the microstructure of silicon prepared in example 4 and FIG. 10 showing the microstructure of silicon prepared in comparative example 1 are mutually compared, it can be recognized that silicon having a microstructure similar to the result of a conventional reaction at a high temperature is obtained by the present invention.

3. BET (Brunauer-Emett-Teller) Surface Area

Table 1 shows the BET surface area of the particles of examples and comparative examples before and after the reduction reaction. The BET surface area of silica before the reaction was 59 $m^2/g$, and the BET surface area of silicon obtained after the reaction (example 4) was 38.57 $m^2/g$. It can be recognized that the BET surface area of silica decreased by 34.6% by the reaction. In contrast, the specific surface area of the obtained silicon was 47 $m^2/g$ and the BET surface area of silica before the reduction reaction was 39.3 $m^2/g$, which shows an increase in the surface area of about 20% in comparative example 4.

Since oxygen is generally lost from silica during a conventional method of carrying out a reduction reaction by a heat treatment at a high temperature, the pore size increases, leading to an increase in the specific surface area. However, since a physical impact is applied on silica in the examples of the present invention, some of the amorphous silica particles agglomerated into a mass, thus causing the surface area to decrease.

TABLE 1

| | Average crystal size of silicon (mm) | BET surface area of silica before reduction reaction ($m^2/g$) | BET surface area of silicon after reduction reaction ($m^2/g$) |
|---|---|---|---|
| Example 4 | 51.9 | 59 | 38.57 |
| Example 5 | 33.1 | 59 | — |
| Comparative example 4 | — | 39.3 | 47 |

What is claimed is:

1. A method of preparing silicon using silica, the method comprising:
   placing silica in a reaction chamber;
   adding a reducing agent into the reaction chamber;
   feeding a material for impact into the reaction chamber and sealing the reaction chamber; and
   reducing the silica to silicon by allowing the material for impact to generate a physical impact inside the reaction chamber,
   wherein the reduction of silica is terminated after an observation of a dramatic change in pressure in the reaction chamber, wherein the dramatic change in pressure is a 1.5-fold to 20-fold increase followed by a decrease of the pressure inside the reaction chamber.

2. The Method of claim 1, wherein the silica is plant-derived silica.

3. The method of claim 2, wherein the silica is chaff-derived silica.

4. The method of claim 3, wherein the chaff-derived silica is acquired by heat-treating chaff at a temperature in the range of 500°C. to 700°C. for a period ranging from 30 minutes to 300 minutes under an oxygen or air atmosphere.

5. The method of claim 1, wherein the reducing agent includes at least one selected from the group consisting of sodium (Na), magnesium (Mg), calcium (Ca), potassium (K), manganese(Mn), iron (Fe), boron (B), aluminum (Al), titanium (Ti), and a mixture thereof.

6. The method of claim 1, wherein the reducing agent is added at 0.7 to 1.5 equivalent weights with respect to 1 equivalent weight of the silica.

7. The method of claim 1, further comprising:
   pressurizing the reaction chamber after the sealing of the reaction chamber so that the internal pressure thereof is in the range of 1 bar to 100 bar.

8. The method of claim 1, wherein the physical impact is generated by a linear motion or rotary motion of the material for impact inside the reaction chamber caused by a rotation of the reaction chamber.

9. The method of claim 1, further comprising:
   acquiring reaction products from the reaction chamber and treating the reaction products with an acid after the reduction of silica.

10. The method or claim 9, wherein the treating the reaction products with an acid is carried out for 30 minutes to 200 minutes at a temperature in the range of 60° C. to 80° C. by adding an acid having pH in the range of 0.01 to less than 7.0.

\* \* \* \* \*